(12) United States Patent
Kang et al.

(10) Patent No.: US 7,146,197 B2
(45) Date of Patent: Dec. 5, 2006

(54) PORTABLE COMMUNICATION DEVICE WITH TWO HOUSINGS CONNECTED BY CYLINDRICAL HINGE

(75) Inventors: Sung-Ill Kang, Gumi-si (KR); Sung-Sun Park, Gumi-si (KR); Chang-Heum Byun, Gumi-si (KR); Seung-Min Park, Seoul (KR); In-Gon Park, Gangnam-gu (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 225 days.

(21) Appl. No.: 10/684,835

(22) Filed: Oct. 15, 2003

(65) Prior Publication Data

US 2004/0132482 A1    Jul. 8, 2004

(30) Foreign Application Priority Data

Oct. 15, 2002  (KR)  ...................... 10-2002-0062995
May 6, 2003   (KR)  ...................... 10-2003-0028554

(51) Int. Cl.
*H04M 1/00* (2006.01)

(52) U.S. Cl. ............................... 455/575.1; 455/575.3; 455/575.4; 455/347; 455/348; 455/349; 348/333.06; 348/373; 348/374; 439/31

(58) Field of Classification Search ............ 455/575.1, 455/575.3, 575.4, 347, 348, 349; 348/333.06, 348/373, 374; 439/31
See application file for complete search history.

(56) References Cited

U.S. PATENT DOCUMENTS

| | | | | |
|---|---|---|---|---|
| 5,485,517 A | * | 1/1996 | Gray ...................... | 379/433.13 |
| 5,636,275 A | * | 6/1997 | Takagi et al. .......... | 379/433.13 |
| 5,640,690 A | * | 6/1997 | Kudrna .................... | 455/575.3 |
| 5,704,094 A | * | 1/1998 | Hartigan et al. ............... | 16/303 |
| D427,172 S | * | 6/2000 | Bequir ....................... | D14/138 |
| 6,148,079 A | * | 11/2000 | Chintala et al. ........ | 379/433.13 |
| 6,487,396 B1 | * | 11/2002 | Sassi .......................... | 455/90.1 |
| 6,535,605 B1 | * | 3/2003 | Ghassabian .............. | 379/433.1 |
| 6,549,789 B1 | * | 4/2003 | Kfoury .................... | 455/550.1 |
| 6,658,272 B1 | * | 12/2003 | Lenchik et al. ............. | 345/164 |
| 6,726,106 B1 | * | 4/2004 | Han et al. ............... | 235/472.01 |
| 6,766,952 B1 | * | 7/2004 | Luu ............................ | 235/451 |
| D495,672 S | * | 9/2004 | Jeon et al. ................. | D14/138 |

(Continued)

FOREIGN PATENT DOCUMENTS

DE     10120067     6/2002

(Continued)

*Primary Examiner*—Steve M. D'Agosta
(74) *Attorney, Agent, or Firm*—Roylance, Abrams, Berdo & Goodman LLP (57) ABSTRACT

A portable communication device is disclosed. The portable communication device comprises a first housing extending in the longitudinal direction thereof, a second housing rotated about a first hinge axis perpendicular to the longitudinal direction of the first housing such that the angle between a bottom surface of the second housing and a corresponding top surface of the first housing varies, and a cylindrical hinge housing disposed at one end of the first housing while a portion of the cylindrical hinge housing protrudes outward from the first housing. The first hinge axis extends in the diametrical direction of the cylindrical hinge housing wherein the second housing is attached to the cylindrical hinge housing while the second housing is rotated about the first hinge axis. The cylindrical hinge housing has a second hinge axis extending in the axial direction of the cylindrical hinge housing so that the second housing can rotate about the second hinge axis. The second hinge axis is perpendicular to the first hinge axis.

26 Claims, 11 Drawing Sheets

U.S. PATENT DOCUMENTS

| | | | |
|---|---|---|---|
| 6,850,784 B1 * | 2/2005 | SanGiovanni | 455/575.1 |
| D502,932 S * | 3/2005 | Minamide | D14/138 |
| 2001/0004269 A1 * | 6/2001 | Shibata et al. | 348/333.06 |
| 2002/0037743 A1 | 3/2002 | Takahashi | |
| 2003/0017810 A1 * | 1/2003 | Janninck et al. | 455/90 |
| 2003/0104789 A1 * | 6/2003 | Torri et al. | 455/90 |

FOREIGN PATENT DOCUMENTS

| | | |
|---|---|---|
| EP | 1126709 | 8/2001 |
| JP | 200078549 | 3/2000 |
| WO | 0145283 | 6/2001 |
| WO | WO-0145283 * | 6/2001 |
| WO | 0184269 | 11/2001 |

* cited by examiner

PORTABLE COMMUNICATION DEVICE WITH TWO HOUSINGS CONNECTED BY CYLINDRICAL HINGE

PRIORITY

This application claims priority to an application entitled "PORTABLE COMMUNICATION DEVICE", filed in the Korean Intellectual Property Office on Oct. 15, 2002 and assigned Ser. No. 2002-62995, and to another application entitled "PORTABLE COMMUNICATION DEVICE", filed in the Korean Intellectual Property Office on May 6, 2003 and assigned Ser. No. 2003-28554, the contents of which are incorporated herein by reference.

BACKGROUND OF THE INVENTION

1. Field of the Invention

The present invention relates to a portable communication device, and more particularly to a portable communication device which is capable of rotating about two axes.

2. Description of the Related Art

In general, "portable communication devices" are devices that are portable and enable owners of the devices to communicate wirelessly. On the basis of their structure, portable communication devices may be classified into several types. For example, portable wireless terminals may be classified into a bar-type wireless terminal, a flip-type wireless terminal, and a folder-type wireless terminal. The bar-type wireless terminal has a bar-type single housing, the flip-type wireless terminal comprises a bar-type housing and a flip portion pivotally attached to the housing, and the folder-type wireless terminal comprises a bar-type housing and a folder portion pivotally attached to the housing.

On the basis of where or how they are worn, the portable wireless terminals may also be classified into a necklace-type wireless terminal and a wrist-type wireless terminal. The necklace-type wireless terminal is worn on the neck of a user by means of a string, and the wrist-type wireless terminal is worn on the wrist of the user.

On the basis of how they are opened or closed, the portable wireless terminals may be further classified into a rotating-type wireless terminal and a sliding-type wireless terminal. The rotating-type wireless terminal is characterized by two housings that are rotatably connected to each other while being continuously opposite each other. The rotating-type wireless terminal is opened or closed by the rotation of the two housings in such a manner that the housings are rotated apart from or toward each other. On the other hand, the sliding-type wireless terminal is characterized by one of two housings being able to be longitudinally slid relative to the other housing. The sliding-type wireless terminal is opened or closed by the sliding movement of one of the housings in such a manner that the housings are apart from or close to each other.

Each conventional portable wireless terminal is indispensably provided with an antenna unit, data input/output units, and data transmitting/receiving units. For the data input unit, a keypad is typically used, in which data is input by means of finger pushing actions. Alternatively, a touch pad or a touch screen may be used. For the data output unit, a Liquid Crystal Display (LCD) may be used.

The keypad, which is used to input data, generally comprises a plurality of keys. The keys include numeral keys, character keys, a "send" key, an "end" key, and function keys. The keys are generally arranged and protrude from the top surface of the housing of the terminal. For example, about 15 to 20 keys are arranged at prescribed locations on the top surface of the housing of the terminal. The keys project through the top surface of the housing of the terminal so that a user of the terminal can push the keys to input desired data. Also, the conventional portable communication device is provided with a camera lens so that a user of the device can talk with another user of the device while looking at each other, or take pictures of his/her desired subjects.

User demand for information gathering is on the increase. The Internet and multimedia environment have rapidly expanded. It is very inconvenient, however, to communicate in such an environment using the aforesaid conventional wireless terminals. Especially, the LCD, which is fixedly attached to the housing of the terminal or rotatably attached to the housing of the terminal in only one direction at the most, which is inconvenient for a user of the terminal.

SUMMARY OF THE INVENTION

Therefore, the present invention has been made in view of the prior art, and it is an object of the present invention to provide a portable communication device which is easy and convenient to use.

In accordance with one aspect of the present invention, the above and other objects can be substantially accomplished by the provision of a portable communication device comprising a first housing; a second housing rotated such that the angle between one surface of the second housing and a corresponding surface of the first housing varies or such that the angle between the longitudinal axis of the second housing and that of the first housing varies; a cylindrical stationary housing formed integrally to the first housing; and a cylindrical rotary housing rotatably attached to the cylindrical stationary housing, wherein the second housing is rotatably connected to the first housing via the cylindrical rotary housing so that the second housing can be rotated about two axes.

In accordance with another aspect of the present invention, there is provided a portable communication device comprising a first housing extending in the longitudinal direction thereof; a second housing rotated about a first hinge axis perpendicular to the longitudinal direction of the first housing such that the angle between the bottom surface of the second housing and the corresponding top surface of the first housing varies; and a cylindrical hinge housing disposed at one end of the first housing while a portion of the cylindrical hinge housing protrudes outward from the first housing, the first hinge axis extending in the diametrical direction of the cylindrical hinge housing such that the second housing is attached to the cylindrical hinge housing while the second housing is rotated about the first hinge axis, the cylindrical hinge housing having a second hinge axis extending in the axial direction of the cylindrical hinge housing so that the second housing can be rotated about the second hinge axis, the second hinge axis being perpendicular to the first hinge axis.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Several embodiments of the present invention will be described in detail with reference to the accompanying drawings. In the following, a detailed description of known functions and configurations will be omitted for conciseness.

Figure 1:
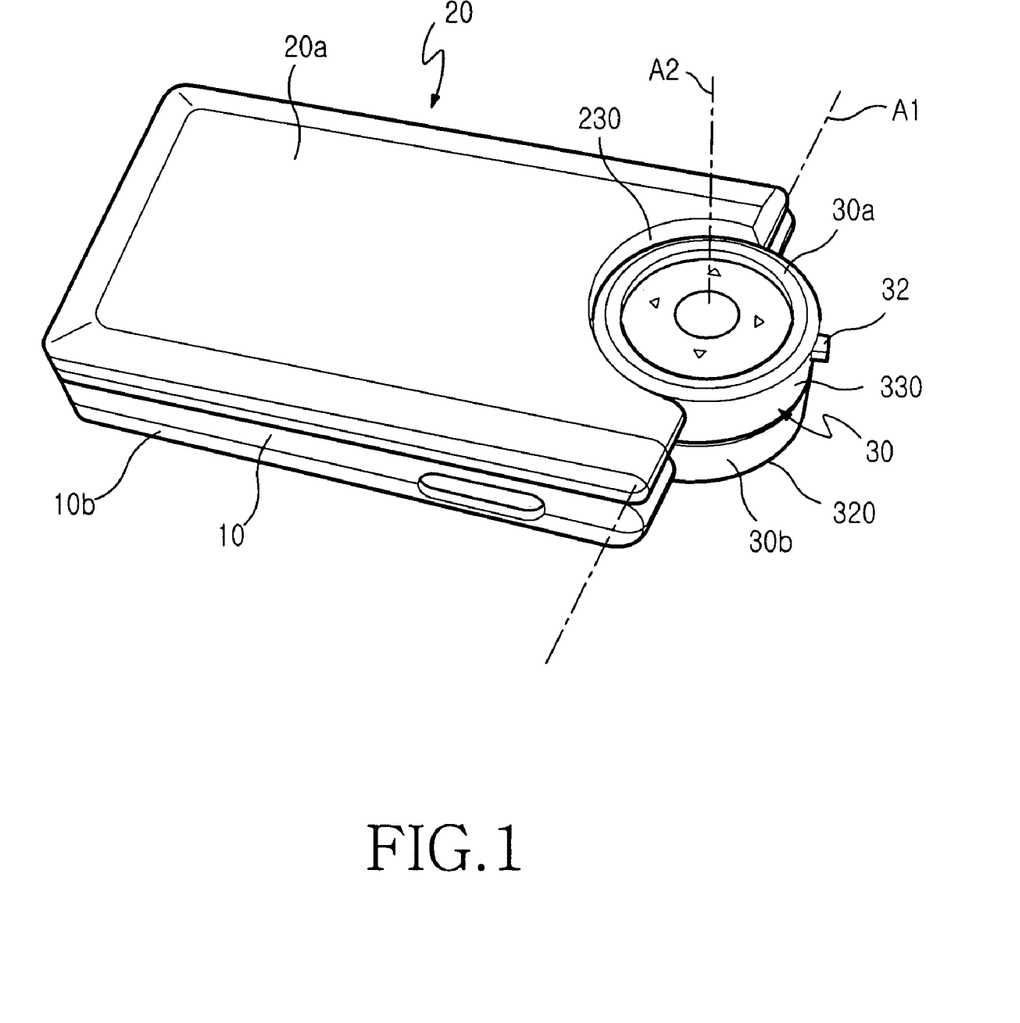
FIG. 1 is a perspective view of a portable communication device according to a first embodiment of the present invention showing a second housing entirely placed on a first housing.
Figure 2:
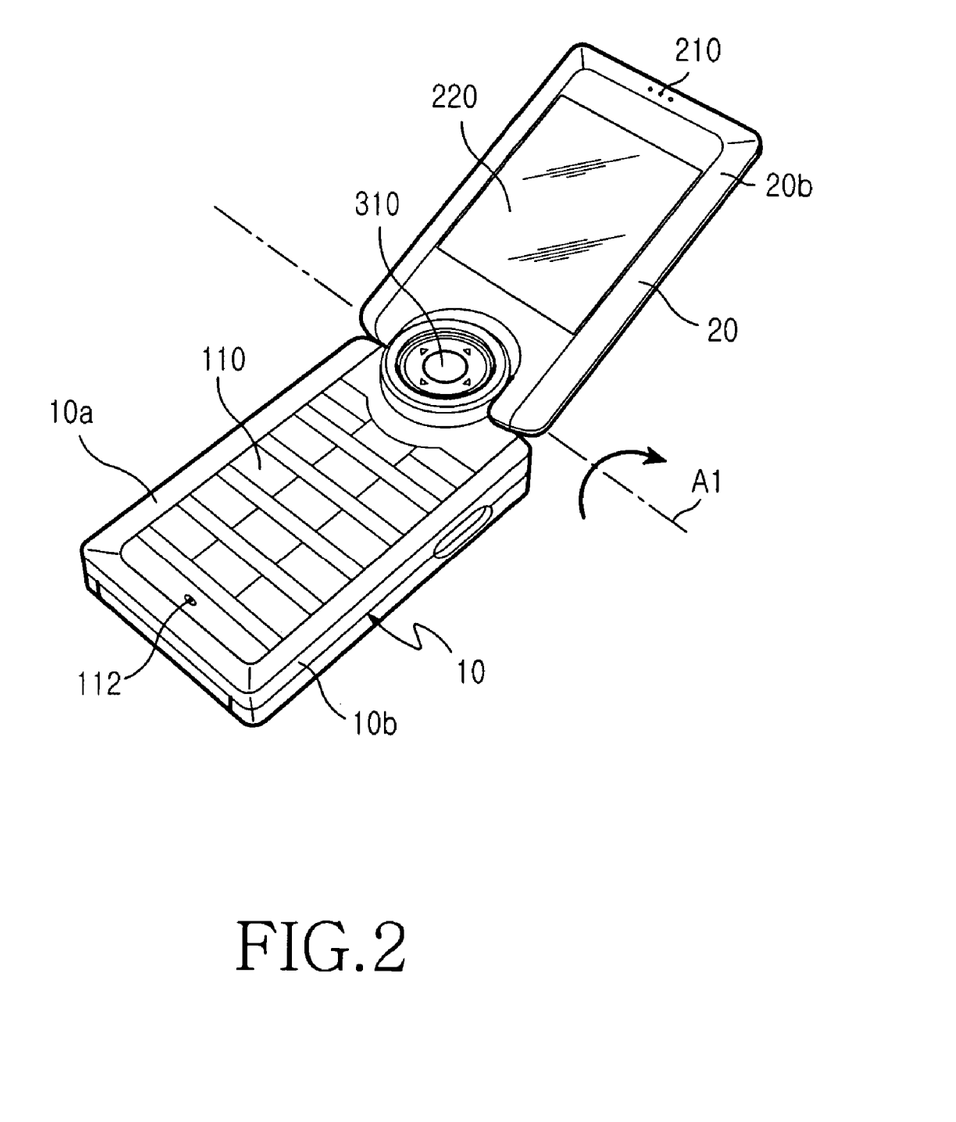
FIG. 2 is a perspective view of the portable communication device according to the first embodiment of the present invention showing the second housing rotated about a first hinge axis.
Figure 3:
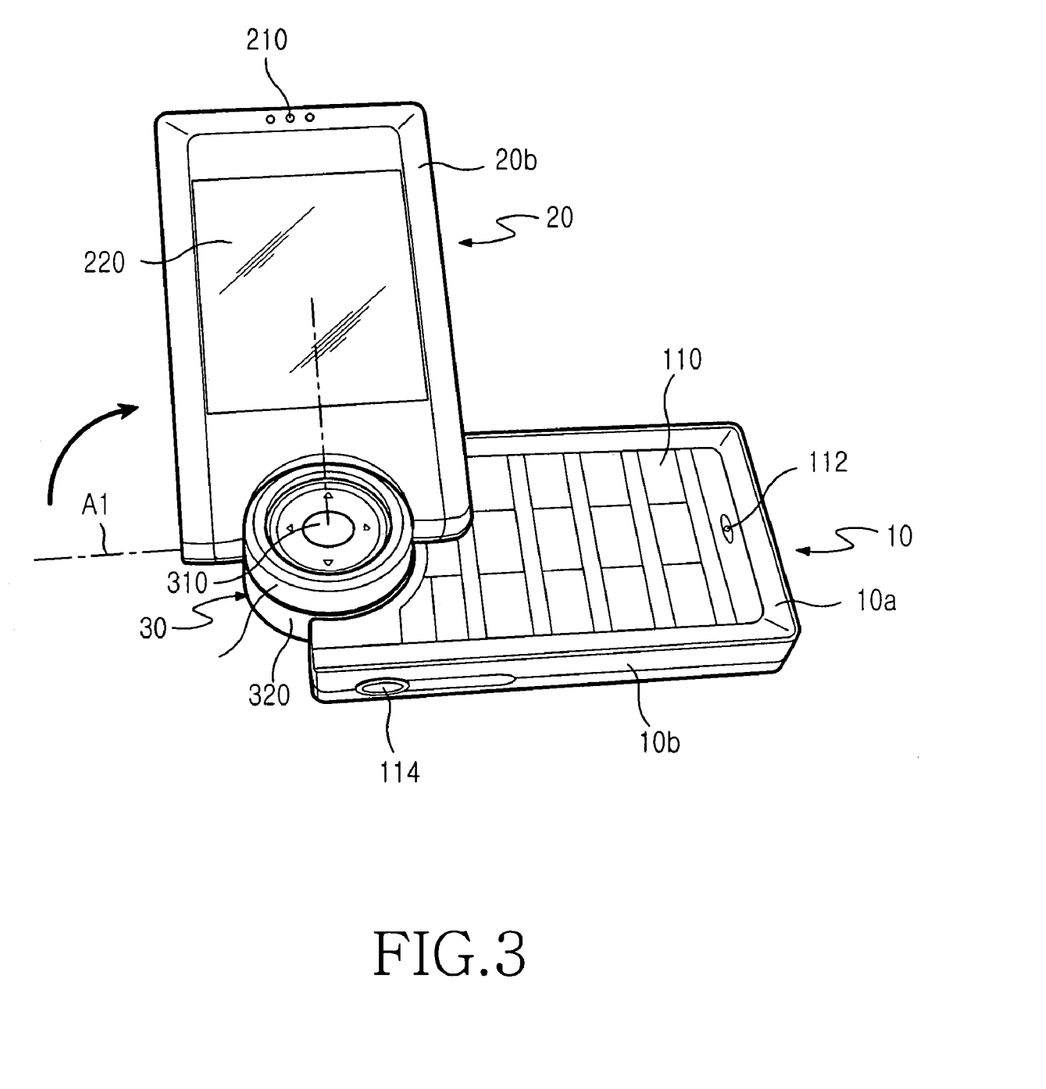
FIG. 3 is a perspective view of the portable communication device according to the first embodiment of the present invention showing the second housing rotated about a second hinge axis provided at a cylindrical hinge housing by an angle of approximately 90 degrees.

As shown in FIGS. 1 to 3, a portable communication device according to a first embodiment of the present invention comprises a first housing 10, a second housing 20, and a cylindrical hinge housing 30. The second housing 20 can be rotated about two axes. Specifically, the second housing 20 can be rotated such that the angle between the bottom surface of the second housing 20 and the corresponding top surface of the first housing 10 varies or such that the angle between the longitudinal axis of the second housing 20 and that of the first housing 10 varies. The second housing 20 is rotatably connected to the first housing 10 via the cylindrical hinge housing 30. Preferably, the cylindrical hinge housing 30 is formed at the central position of one end of the first housing 10. Referring to FIG. 1, a half of the cylindrical hinge housing 30 protrudes out of the first and second housings 10 and 20 in the longitudinal direction of the first and second housings 10 and 20.

Specifically, the second housing 20 is rotatably connected to the first housing 10 via the cylindrical hinge housing 30 in a direction in which the second housing 20 moves away from the first housing 10 via the rotation of the second housing 20 about a first hinge axis A1 from the position where the second housing 20 is substantially placed on the first housing 10. Also, the second housing 20 is attached to the cylindrical hinge housing 30 such that the second housing 20 can be rotated about a second hinge axis A2. The first and second hinge axis A1 and A2 are provided at the cylindrical hinge housing 30. The first and second hinge axes A1 and A2 are perpendicular to each other. The first hinge axis A1 extends in the diametrical direction of the cylindrical hinge housing 30, and the second hinge axis A2 extends in the axial direction of the cylindrical hinge housing 30.

The first housing 10 extends in the longitudinal direction thereof. At one end of the first housing 10 is formed the cylindrical hinge housing 30 with the upper part thereof protruding. On the top surface 10a of the first housing 10 are arranged a plurality of keys 110 and a microphone unit 112 (see FIG. 2). On the side surfaces 10b of the first housing 10 are arranged a plurality of keys 110 and a first camera lens 114 (see FIG. 3).

The second housing 20 can be rotated about the first hinge axis A1 in the direction in which the second housing 20 moves away from or toward the first housing 10. On the bottom surface 20b of the second housing 20 is arranged a speaker unit 210 and a LCD 220. At a prescribed location of one end of the second housing 20 is formed a semicircular opening 230. The second housing 20 can be rotated about the first hinge axis A1 at the cylindrical hinge housing 30 by means of the opening 230. In an embodiment of the present invention, a touch screen maybe used instead of the LCD 220.

The cylindrical hinge housing 30 is provided at one end of the first housing 10 while being extended vertically. The cylindrical hinge housing 30 has the first and second hinge axes A1 and A2. The cylindrical hinge housing 30 comprises a cylindrical stationary housing 320 and a cylindrical rotary housing 330 rotatably attached to the cylindrical stationary housing 320. The cylindrical hinge housing 30 has a top surface 30a and an outer circumferential surface 30b. The cylindrical stationary housing 320 is fixed to the first housing 10. The cylindrical rotary housing 330 has the second hinge axis A2 extended vertically through the center of the top surface 30a thereof. The second hinge axis A2 is perpendicular to the first hinge axis A1. Consequently, the second housing 20 can be rotated about the first and second hinge axes A1 and A2. The first hinge axis A1 extends in the diametrical direction of the cylindrical rotary housing 330. When the second housing 20 is rotated about the second hinge axis A2, the first hinge axis A1 is rotated along with the second housing 20.

The cylindrical rotary housing 330 has at least one key 310 arranged on the top surface 30a thereof, and a protrusion 32 formed at a prescribed location of the outer circumferential surface 30b thereof for restricting the rotation of the second housing 20.

When the second housing 20 is substantially placed on the first housing 10 as shown in FIG. 1, the keys 110 of the first housing 10 is closest to the LCD 220 of the second housing 20. When the second housing 20 is rotated about the first hinge axis A1 such that the second housing moves away from the first housing 10 as shown in FIG. 2, the speaker unit 210 of the second housing 20 is farthest from the microphone unit 112 of the first housing 10, and the LCD 220 and the keys 110 are turned towards a user of the device. At this time, the edge of the opening 230 of the second housing 20 makes contact with the protrusion 32 and the second housing 20 can no longer rotate. When the second housing 20 is rotated about the second hinge axis A2 as shown in FIG. 3, the second housing is placed at an angle to the first housing 10.

Figure 4:
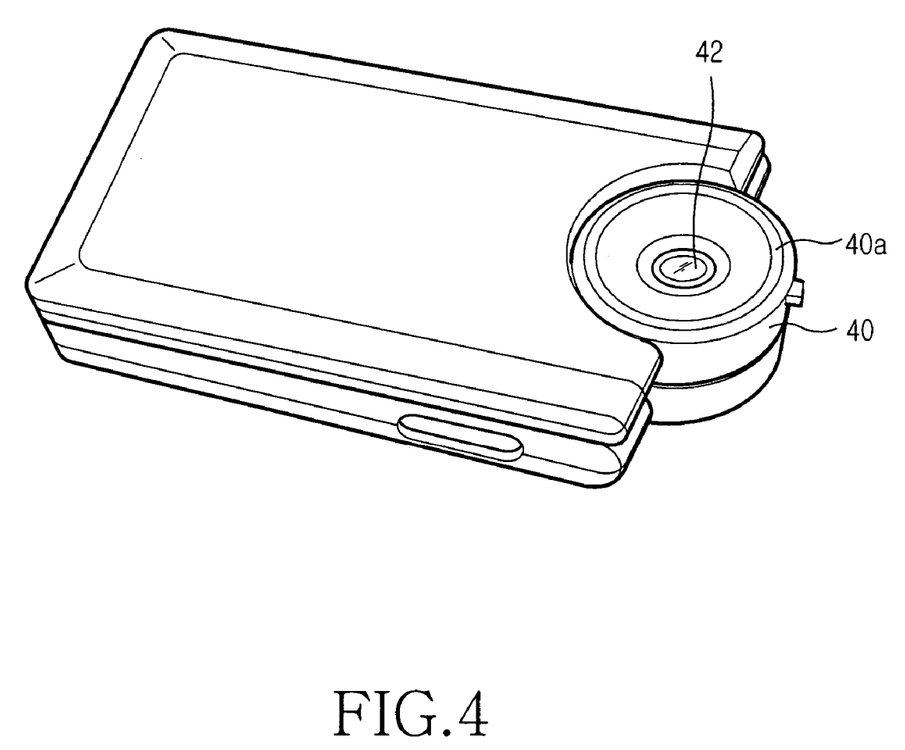
FIG. 4 is a perspective view of a portable communication device according to a second embodiment of the present invention showing a second housing substantially placed on a first housing.

FIG. 4 is a perspective view of a portable communication device according to a second embodiment of the present invention. On the top surface 40a of a cylindrical hinge housing 40 is arranged a second camera lens 42, as shown in FIG. 4. The portable communication device according to this embodiment is substantially identical to that of the first embodiment of the present invention except that the second camera lens 42 is arranged on the top surface 40a of the cylindrical hinge housing 40 whereas the key 310 is arranged on the top surface 30a of the cylindrical hinge housing 30 as shown in FIG. 1 in the first embodiment of the present invention. Accordingly, a detailed description of the portable communication device according to the second embodiment of the present invention will not be provided.

Figure 5:
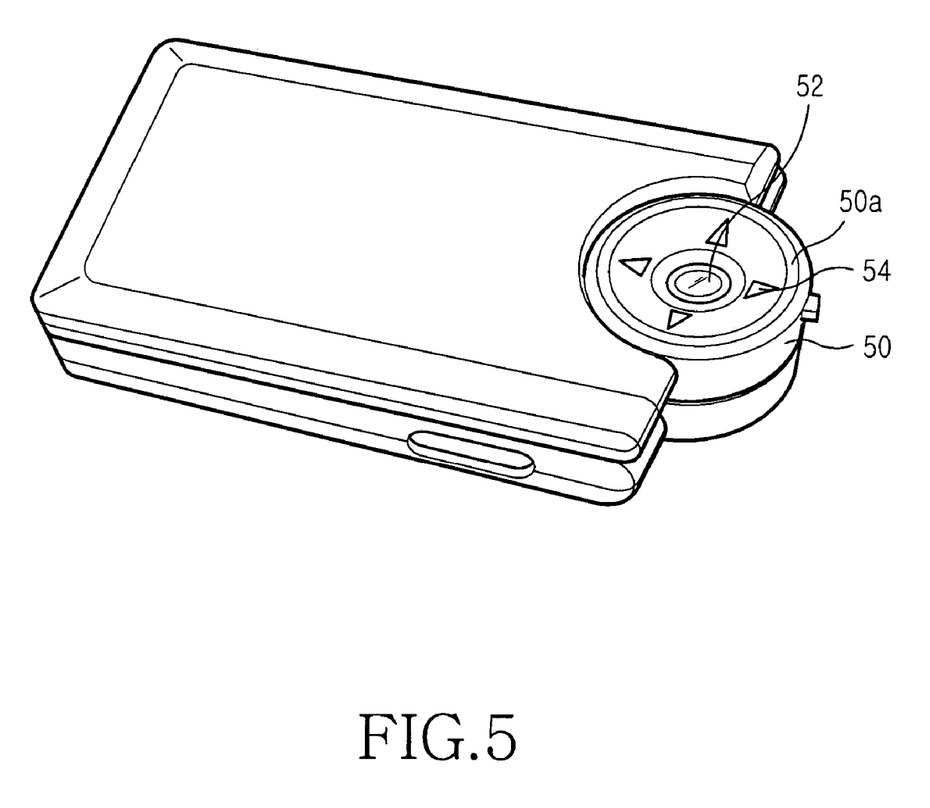
FIG. 5 is a perspective view of a portable communication device according to a third embodiment of the present invention showing a second housing substantially placed on a first housing.

FIG. 5 is a perspective view of a portable communication device according to a third embodiment of the present invention. On the top surface 50a of a cylindrical hinge housing 50 is arranged a third camera lens 52 and at least one key 54, as shown in FIG. 5. The key 54 is disposed around the third camera lens 52. The portable communication device according to this embodiment is substantially identical to the first and second embodiments of the present invention except that the third camera lens 52 and the key 54 are arranged on the top surface 50a of the cylindrical hinge housing 50 whereas the key 310 is arranged on the top surface 30a of the cylindrical hinge housing 30 as shown in FIG. 1 in the first embodiment of the present invention, and the second camera lens 42 is arranged on the top surface 40a of the cylindrical hinge housing 40 as shown in FIG. 4 in the second embodiment of the present invention. Accordingly, a detailed description of the portable communication device according to the third embodiment of the present invention will not be provided.

Now, portable communication devices according to other various embodiments of the present invention will be described with reference to FIGS. 6 to 11.

Figure 6:
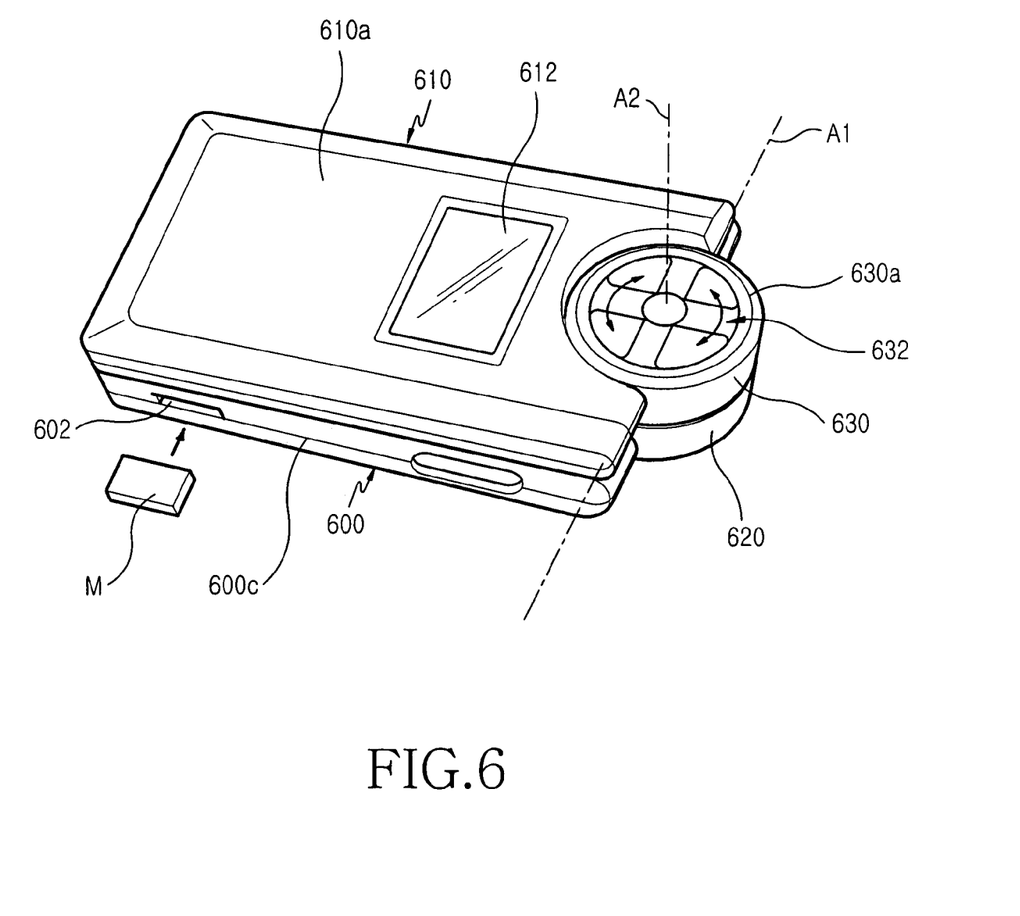
FIG. 6 is a perspective view of a portable communication device according to a fourth embodiment of the present invention showing the top surface of the device.
Figure 7:
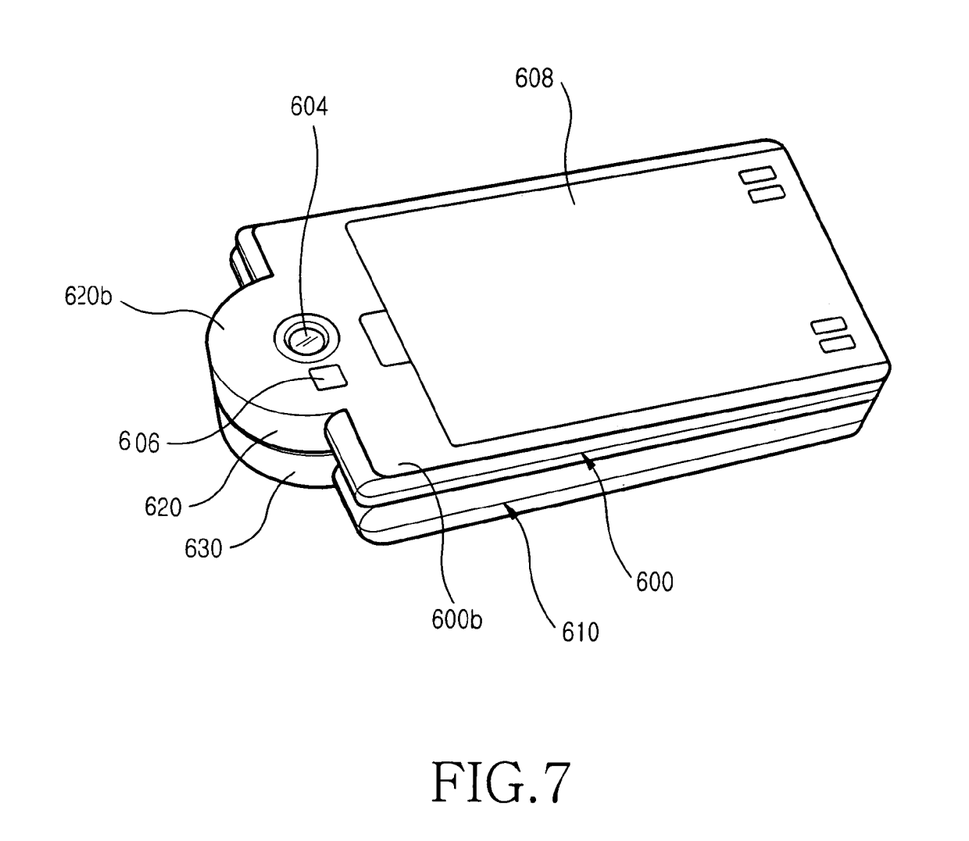
FIG. 7 is a perspective view of the portable communication device according to the fourth embodiment of the present invention showing the bottom surface of the device.

FIG. 6 is a perspective view of a portable communication device according to a fourth embodiment of the present invention showing the top surface of the device, and FIG. 7 is a perspective view of the portable communication device according to the fourth embodiment of the present invention showing the bottom surface of the device. As shown in FIGS. 6 and 7, the portable communication device comprises a first housing 600, a second housing 610 rotated such that the angle between the bottom surface of the second housing 610 and the corresponding top surface of the first housing 600 varies or such that the angle between the longitudinal axis of the second housing 610 and that of the first housing 600 varies, a cylindrical stationary housing 620 formed integrally to the first housing 600, and a cylindrical rotary housing 630 rotatably attached to the cylindrical stationary housing 620, wherein the second housing 610 is rotatably attached to the cylindrical rotary housing 630. Consequently, the second housing 610 can be rotated about first and second hinge axes A1 and A2.

On the top surface 610a of the second housing 610 is arranged an auxiliary display unit 612. On the top surface 630a of the cylindrical rotary housing 630 is arranged a rotary key 632. The rotary key 632 is rotated on the top surface 630a of the second housing 630 about the second hinge axis A2. The rotary key 632 is rotated and then pushed so that desired data is input.

At one of the side surfaces 600c of the first housing 600 is formed a slot 602 through which a memory card M is inserted. The bottom surface 600b of the first housing 600 has detachably attached a battery pack 608. At the bottom surface 620b of the cylindrical stationary housing 620 is arranged a camera lens 604 and a lighting unit 606, which is disposed adjacent to the camera lens 604. The auxiliary display unit 612 is preferably an LCD. Also, the lighting unit 606 is preferably an LED, which is an optical light emitting device.

Although the top surface of the first housing 600 and the bottom surface of the second housing 610 are not shown in FIGS. 6 and 7 since the second housing 610 is substantially placed on the first housing 600, the construction of the top surface of the first housing 600 and the bottom surface of the second housing 610, such as the arrangement of a speaker unit, a microphone unit, a plurality of keys, and a main display unit, is substantially identical to that of the first embodiment of the present invention as shown in FIG. 2. Accordingly, a further description of the portable communication device according to the fourth embodiment of the present invention will not be provided.

Figure 8:
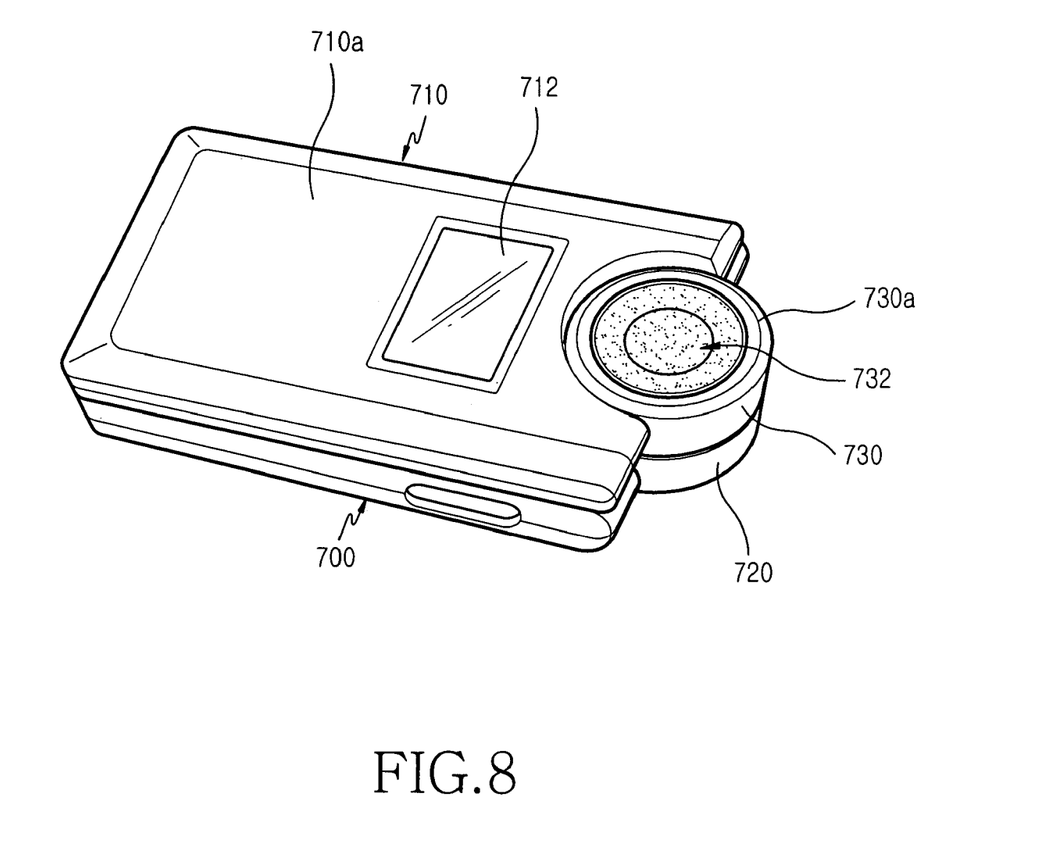
FIG. 8 is a perspective view of a portable communication device according to a fifth embodiment of the present invention showing the top surface of the device.
Figure 9:
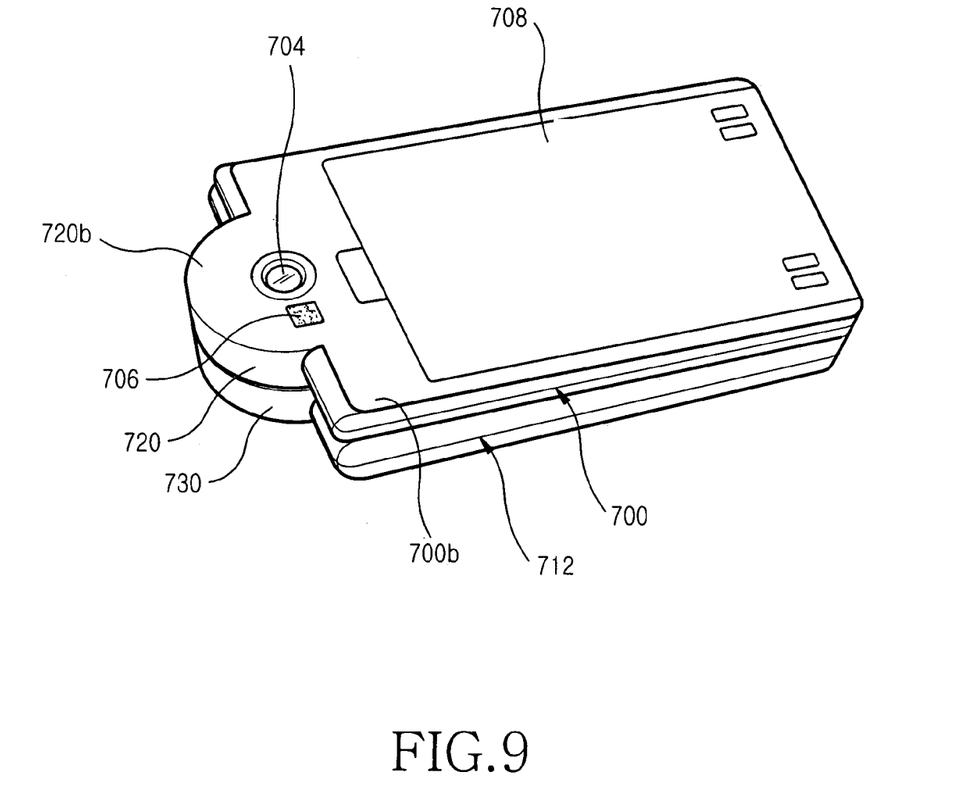
FIG. 9 is a perspective view of the portable communication device according to the fifth embodiment of the present invention showing the bottom surface of the device.

FIG. 8 is a perspective view of a portable communication device according to a fifth embodiment of the present invention showing the top surface of the device, and FIG. 9 is a perspective view of the portable communication device according to the fifth embodiment of the present invention showing the bottom surface of the device. As shown in FIGS. 8 and 9, the portable communication device comprises a first housing 700, a second housing 710 rotated about a first hinge axis such that the angle between the bottom surface of the second housing 710 and the corresponding top surface of the first housing 700 varies or rotates about a second hinge axis such that the angle between the longitudinal axis of the second housing 710 and that of the first housing 700 varies, a cylindrical stationary housing 720 formed integrally to the first housing 700, and a cylindrical rotary housing 730 rotatably attached to the cylindrical stationary housing 720, wherein the second housing 710 is rotatably attached to the cylindrical rotary housing 730.

On the top surface 710a of the second housing 710 is arranged an auxiliary display unit 712. On the top surface 730a of the cylindrical rotary housing 730 is arranged a security unit 732. The security unit 732, which is provided to prevent unauthorized use of the portable communication device, is preferably a fingerprint-identifying device. When an owner of the portable communication device touches the fingerprint-identifying device 732, the fingerprint of the owner is identified so that the portable communication device is unlocked.

The bottom surface 700b of the first housing 700 has detachably attached a battery pack 708. At the bottom surface 720b of the cylindrical stationary housing 720 is arranged a camera lens 704 and a lighting unit 706, which is disposed adjacent to the camera lens 704. The auxiliary display unit 712 is preferably an LCD. Also, the lighting unit 706 is preferably an LED.

Although the top surface of the first housing 700 and the bottom surface of the second housing 710 are not shown in FIGS. 8 and 9 since the second housing 710 is entirely placed on the first housing 700, the construction of the top surface of the first housing 700 and the bottom surface of the second housing 710, such as the arrangement of a speaker unit, a microphone unit, a plurality of keys, and a main display unit, is identical to that of the first embodiment of the present invention as shown in FIG. 2. Accordingly, a description of the portable communication device according to the fifth embodiment of the present invention will not be provided.

Figure 10:
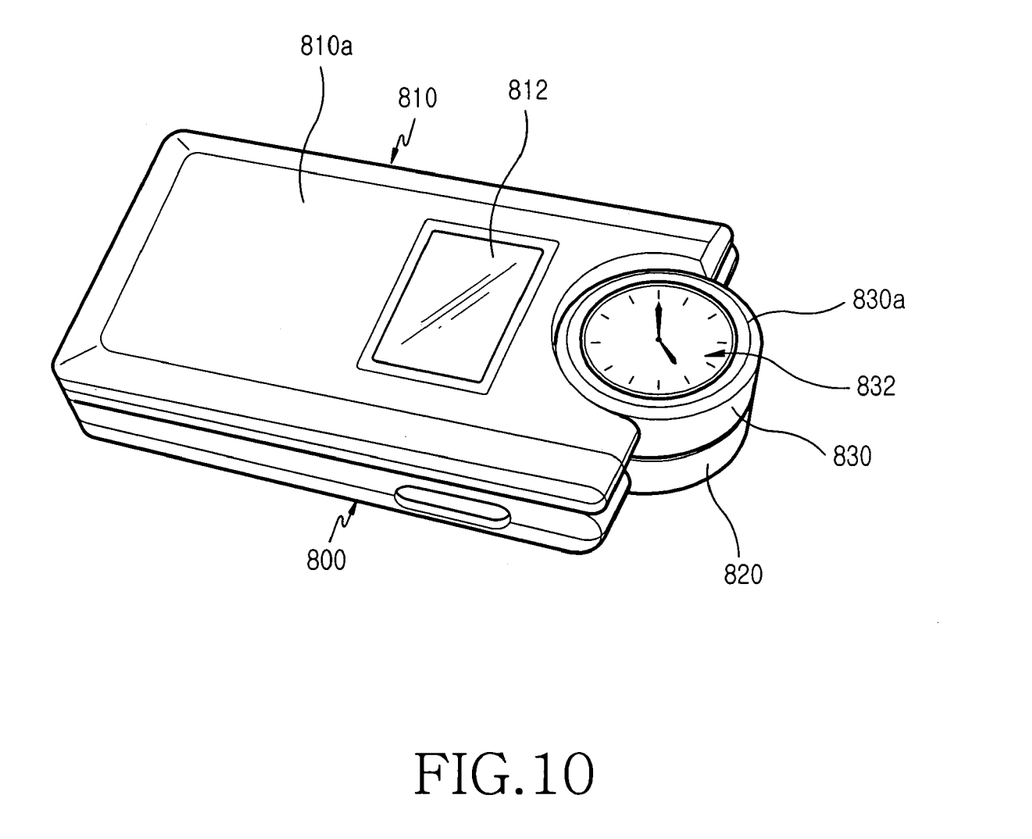
FIG. 10 is a perspective view of a portable communication device according to a sixth embodiment of the present invention showing the top surface of the device.
Figure 11:
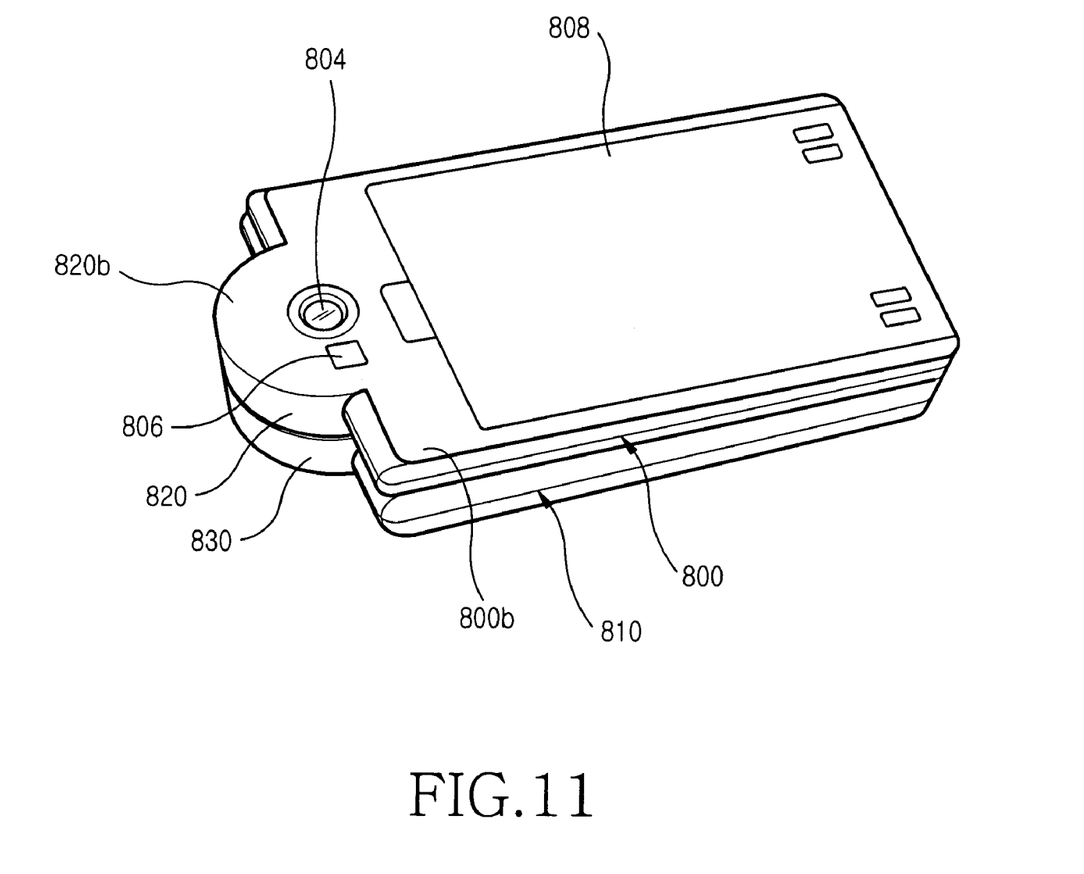
FIG. 11 is a perspective view of the portable communication device according to the sixth embodiment of the present invention showing the bottom surface of the device.

FIG. 10 is a perspective view of a portable communication device according to a sixth embodiment of the present invention showing the top surface of the device, and FIG. 11 is a perspective view of the portable communication device according to the sixth embodiment of the present invention showing the bottom surface of the device. As shown in FIGS. 10 and 11, the portable communication device comprises a first housing 800, a second housing 810 rotated such that the angle between the bottom surface of the second housing 810 and the corresponding top surface of the first housing 800 varies or such that the angle between the longitudinal axis of the second housing 810 and that of the first housing 800 varies, a cylindrical stationary housing 820 formed integrally to the first housing 800, and a cylindrical rotary housing 830 rotatably attached to the cylindrical stationary housing 820, wherein the second housing 810 is rotatably attached to the cylindrical rotary housing 830.

On the top surface 810*a* of the second housing 810 is arranged an auxiliary display unit 812. On the top surface 830*a* of the cylindrical rotary housing 830 is arranged a clock 832, which may be a digital or analog clock. The bottom surface 800*b* of the first housing 800 has detachably attached a battery pack 808. At the bottom surface 820*b* of the cylindrical stationary housing 820 is arranged a camera lens 804 and a lighting unit 806, which is disposed adjacent to the camera lens 804. The auxiliary display unit 812 is preferably an LCD. Also, the lighting unit 806 is preferably an LED.

Although the top surface of the first housing 800 and the bottom surface of the second housing 810 are not shown in FIGS. 10 and 11 since the second housing 810 is substantially placed on the first housing 800, the construction of the top surface of the first housing 800 and the bottom surface of the second housing 810, such as the arrangement of a speaker unit, a microphone unit, a plurality of keys, and a main display unit, is identical to that of the first embodiment of the present invention as shown in FIG. 2. Accordingly, a description of the portable communication device according to the sixth embodiment of the present invention will not be provided.

As apparent from the above description, the second housing of the portable communication device can be rotated about the first and second hinge axes provided at the cylindrical hinge housing, whereby the portable communication device can be conveniently used. Furthermore, a user of the portable communication device can talk with another user of the portable communication device while looking at each other. Also, the user of the portable communication device can take pictures of his/her desired subjects, or view the pictures on the display unit of the portable communication device.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A portable communication device comprising:
 a first housing having a first end and a second end;
 a second housing rotated such that the angle between one surface of the second housing and a corresponding surface of the first housing varies such that the angle between a longitudinal axis of the second housing and that of the first housing varies;
 a cylindrical stationary housing formed integrally to the first end of the first housing, the cylindrical stationary housing being narrower in width than the first end of the first housing and being disposed at a central position of the first end of the first housing;
 a cylindrical rotary housing rotatably attached to the cylindrical stationary housing, wherein the second housing is rotatably connected to the first housing via the cylindrical rotary housing wherein the second housing can be rotated about two axes, the cylindrical rotary housing having a protrusion formed at the outer circumferential surface of the cylindrical rotary housing for restricting the rotation of the second housing, the cylindrical rotary housing being disposed at a central position of the first end of the first housing; and
 an auxiliary display unit arranged at a prescribed location on the top surface of the second housing.

2. The device as set forth in claim 1, further comprising a camera lens arranged on the top surface of the cylindrical rotary housing.

3. The device as set forth in claim 2, further comprising at least one key disposed around the camera lens.

4. A portable communication device comprising:
 a first housing extending in the longitudinal direction;
 a second housing rotated about a first hinge axis perpendicular to the longitudinal direction of the first housing such that the angle between the bottom surface of the second housing and the corresponding top surface of the first housing varies, the second housing having a substantially semicircular opening;
 a cylindrical hinge housing disposed at a central position of one end of the first housing while a portion of the cylindrical hinge housing protrudes outward from the first housing, the cylindrical hinge housing being partially disposed in the semicircular opening, the first hinge axis extending in the diametrical direction of the cylindrical hinge housing wherein the second housing is attached to the cylindrical hinge housing while the second housing is rotated about the first hinge axis, the cylindrical hinge housing having a second hinge axis extending in the axial direction of the cylindrical hinge housing wherein the second housing can be rotated about the second hinge axis, the second hinge axis being perpendicular to the first hinge axis, and the cylindrical hinge housing having a protrusion formed at the outer circumferential surface of the cylindrical hinge housing for restricting the rotation of the second housing; and
 an auxiliary display unit arranged at a prescribed location on the top surface of the second housing.

5. The device as set forth in claim 4, wherein the cylindrical hinge housing comprises:
 a cylindrical stationary housing; and
 a cylindrical rotary housing rotatably attached to the cylindrical stationary housing.

6. The device as set forth in claim 5, wherein the cylindrical stationary housing is attached to the first housing, and the cylindrical rotary housing is rotated substantially in the same direction as that of the second housing.

7. The device as set forth in claim 4, wherein the first housing has a plurality of keys and a microphone unit arranged on the top surface of the first housing, and the second housing has a speaker unit and a main display unit arranged on the bottom surface of the second housing.

8. The device as set forth in claim 4, wherein the cylindrical hinge housing has a camera lens arranged on the top surface of the cylindrical hinge housing.

9. The device as set forth in claim 4, wherein the cylindrical hinge housing has a camera lens arranged on the bottom surface of the cylindrical hinge housing.

10. The device as set forth in claim 4, wherein a camera lens is arranged on the bottom surface of the cylindrical hinge housing, and the cylindrical hinge housing has a rotary key arranged on the top surface of the cylindrical hinge housing, the rotary key being rotated about the second hinge axis.

11. The device as set forth in claim 4, wherein the cylindrical hinge housing has a camera lens arranged at the center of the top surface of the cylindrical hinge housing and at least one key disposed around the camera lens.

12. The device as set forth in claim 4, wherein the cylindrical hinge housing has at least one key arranged on the top surface of the cylindrical hinge housing.

13. The device as set forth in claim 4, wherein a camera lens is arranged on the bottom surface of the cylindrical hinge housing, and an auxiliary display unit is arranged on the top surface of the cylindrical hinge housing, the auxiliary display unit being a digital or analog watch.

14. The device as set forth in claim 4, wherein the first housing has a lighting unit arranged at a prescribed position of the bottom surface of the first housing, wherein the lighting unit comprises a light emitting diode (LED).

15. A portable communication device comprising:
a first housing extending in the longitudinal direction;
a second housing rotated about a first hinge axis perpendicular to the longitudinal direction of the first housing such that the angle between the bottom surface of the second housing and the corresponding top surface of the first housing varies, the second housing having a substantially semicircular opening;
a cylindrical hinge housing disposed at a central position of one end of the first housing while a portion of the cylindrical hinge housing protrudes outward from the first housing, the cylindrical hinge housing being partially disposed in the semicircular opening, the first hinge axis extending in the diametrical direction of the cylindrical hinge housing wherein the second housing is attached to the cylindrical hinge housing while the second housing is rotated about the first hinge axis, the cylindrical hinge housing having a second hinge axis extending in the axial direction of the cylindrical hinge housing wherein the second housing can be rotated about the second hinge axis, the second hinge axis being perpendicular to the first hinge axis, and the cylindrical hinge housing having a protrusion formed at the outer circumferential surface of the cylindrical hinge housing for restricting the rotation of the second housing;
an auxiliary display unit arranged at a prescribed location on the top surface of the second housing; and
a fingerprint-identifying device arranged on the top surface of the cylindrical hinge housing.

16. A portable communication device comprising:
a first housing extending in the longitudinal direction the first housing having a slot formed at one of the side surfaces of the first housing for allowing the insertion of a memory card therethrough;
a second housing rotated about a first hinge axis perpendicular to the longitudinal direction of the first housing such that the angle between the bottom surface of the second housing and the corresponding top surface of the first housing varies, the second housing having a substantially semicircular opening;
a cylindrical hinge housing disposed at a central position of one end of the first housing while a portion of the cylindrical hinge housing protrudes outward from the first housing, the cylindrical hinge housing being partially disposed in the semicircular opening, the first hinge axis extending in the diametrical direction of the cylindrical hinge housing wherein the second housing is attached to the cylindrical hinge housing while the second housing is rotated about the first hinge axis, the cylindrical hinge housing having a second hinge axis extending in the axial direction of the cylindrical hinge housing wherein the second housing can be rotated about the second hinge axis, the second hinge axis being perpendicular to the first hinge axis, and the cylindrical hinge housing having a protrusion formed at the outer circumferential surface of the cylindrical hinge housing for restricting the rotation of the second housing; and
an auxiliary display unit arranged at a prescribed location on the top surface of the second housing.

17. A portable communication device comprising:
a first housing having a first end and a second end;
a second housing rotated such that the angle between one surface of the second housing and a corresponding surface of the first housing varies such that the angle between a longitudinal axis of the second housing and that of the first housing varies;
a cylindrical stationary housing formed integrally to the first end of the first housing, the cylindrical stationary housing being narrower in width than the first end of the first housing and being disposed at a central position of the first end of the first housing;
a cylindrical rotary housing rotatably attached to the cylindrical stationary housing, wherein the second housing is rotatably connected to the first housing via the cylindrical rotary housing wherein the second housing can be rotated about two axes, the cylindrical rotary housing having a protrusion formed at the outer circumferential surface of the cylindrical rotary housing for restricting the rotation of the second housing, the cylindrical rotary housing being disposed at the central position of the first end of the first housing;
an auxiliary display unit arranged at a prescribed location on the top surface of the second housing; and
a camera lens arranged on the bottom surface of the cylindrical stationary housing.

18. A portable communication device comprising:
a first housing having a first end and a second end;
a second housing rotated such that the angle between one surface of the second housing and a corresponding surface of the first housing varies such that the angle between a longitudinal axis of the second housing and that of the first housing varies;
a cylindrical stationary housing formed integrally to the first end of the first housing, the cylindrical stationary housing being narrower in width than the first end of the first housing and being disposed at a central position of the first end of the first housing;
a cylindrical rotary housing rotatably attached to the cylindrical stationary housing, wherein the second housing is rotatably connected to the first housing via the cylindrical rotary housing wherein the second housing can be rotated about two axes, the cylindrical rotary housing having a protrusion formed at the outer circumferential surface of the cylindrical rotary housing for restricting the rotation of the second housing, the cylindrical rotary housing being disposed at the central position of the first end of the first housing;
an auxiliary display unit arranged at a prescribed location on the top surface of the second housing; and
a fingerprint-identifying device arranged on the top surface of the cylindrical rotary housing.

19. A portable communication device comprising:
a first housing having a first end and a second end, the first housing having a slot formed at one of the side surfaces of the first housing for allowing the insertion of a memory card therethrough;
a second housing rotated such that the angle between one surface of the second housing and a corresponding surface of the first housing varies such that the angle between a longitudinal axis of the second housing and that of the first housing varies;
a cylindrical stationary housing formed integrally to the first end of the first housing, the cylindrical stationary housing being narrower in width than the first end of the first housing and being disposed at a central position of the first end of the first housing;
a cylindrical rotary housing rotatably attached to the cylindrical stationary housing, wherein the second housing is rotatably connected to the first housing via the cylindrical rotary housing wherein the second housing can be rotated about two axes, the cylindrical rotary housing having a protrusion formed at the outer circumferential surface of the cylindrical rotary housing for restricting the rotation of the second housing, the cylindrical rotary housing being disposed at the central position of the first end of the first housing; and
an auxiliary display unit arranged at a prescribed location on the top surface of the second housing.

20. A portable communication device comprising:
a first housing having a first end and a second end;
a second housing having a first end and a second, the second housing having a semicircular opening at the first end of the second housing, the semicircular opening being narrower in width than the first end of the second housing; and
a cylindrical hinge having a top surface, a bottom surface, and an outer circumferential surface, the cylindrical hinge housing connecting the first end of the first housing to the first end of the second housing such that the second housing can be rotated about a first axis which extends in the diametrical direction of the cylindrical hinge and a second axis which extends in the axial direction of the cylindrical hinge, the cylindrical hinge comprising:
a cylindrical stationary housing formed integrally with the first end of the first housing at a central position of the first end of the first housing, and
a cylindrical rotary housing rotatably attached to the cylindrical stationary housing, the cylindrical rotary housing being disposed in the semicircular opening in the second housing; and
wherein one of a key, a camera lens, a fingerprint-identifying device, and a clock is disposed on the top surface of the cylindrical hinge.

21. The device as set forth in claim 20, wherein a rotary key is disposed on the top surface of the cylindrical hinge.

22. The device as set forth in claim 20, wherein a camera lens is disposed on the bottom surface of the cylindrical hinge.

23. The device as set forth in claim 20, wherein the first housing has a slot formed at a side surface of the first housing for allowing the insertion of a memory card.

24. The device as set forth in claim 20, wherein a camera lens is disposed on the top surface of the cylindrical rotary housing, and at least one is key disposed around the camera lens.

25. The device as set forth in claim 20, wherein a fingerprint-identifying device is disposed on the top surface of the cylindrical rotary housing, and a camera lens is disposed on the bottom surface of the cylindrical hinge.

26. The device as set forth in claim 20, wherein a clock is disposed on the top surface of the cylindrical rotary housing, and a camera lens is disposed on the bottom surface of the cylindrical hinge.

* * * * *